(12) United States Patent
Colemon

(10) Patent No.: US 7,184,536 B2
(45) Date of Patent: Feb. 27, 2007

(54) INTELLIGENT FORWARDED TELEPHONE CALL HANDLING WITH A CALL ANSWERING SYSTEM

(75) Inventor: James M. Colemon, Buffalo, NY (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/967,108

(22) Filed: Sep. 28, 2001

(65) Prior Publication Data

US 2003/0063719 A1    Apr. 3, 2003

(51) Int. Cl.
*H04M 3/42* (2006.01)
(52) U.S. Cl. .............................. 379/212.01; 379/210.01
(58) Field of Classification Search ............ 379/88.22, 379/88.24, 88.25, 88.05, 88.06, 142.01, 142.04–142.06, 379/156, 157, 165, 265.02, 266.04, 88.18, 379/88.21, 212.01, 209.01, 210.01, 213.01, 379/218.01, 221.01, 229, 231, 232, 235
See application file for complete search history.

(56) References Cited

U.S. PATENT DOCUMENTS

| | | | | |
|---|---|---|---|---|
| 4,926,461 A | * | 5/1990 | Kuok ........................ | 379/88.27 |
| 5,117,451 A | * | 5/1992 | Ladd et al. ............... | 379/88.26 |
| 5,204,894 A | * | 4/1993 | Darden ..................... | 379/88.03 |
| 5,422,942 A | * | 6/1995 | Kakwashima .......... | 379/212.01 |
| 5,459,779 A | * | 10/1995 | Backaus et al. ........ | 379/212.01 |
| 5,479,487 A | * | 12/1995 | Hammond .............. | 379/266.07 |
| 5,509,064 A | * | 4/1996 | Welner et al. .......... | 379/265.02 |
| 5,511,112 A | * | 4/1996 | Szlam ..................... | 379/142.01 |
| 5,555,292 A | * | 9/1996 | Eckhart .................... | 379/88.26 |
| 5,555,299 A | * | 9/1996 | Maloney et al. ........ | 379/142.01 |
| 5,590,187 A | * | 12/1996 | Greenspan .............. | 379/212.01 |
| 5,917,903 A | * | 6/1999 | Jolissaint ................ | 379/207.14 |
| 5,923,745 A | * | 7/1999 | Hurd ....................... | 379/220.01 |
| 5,987,116 A | * | 11/1999 | Petrunka et al. ........ | 379/211.02 |
| 6,005,870 A | * | 12/1999 | Leung et al. ............ | 370/466 |
| 6,134,530 A | * | 10/2000 | Bunting et al. ......... | 379/220.01 |
| 6,160,877 A | * | 12/2000 | Tatchell et al. ......... | 379/212.01 |
| 6,327,343 B1 | * | 12/2001 | Epstein et al. .......... | 379/88.01 |
| 6,366,658 B1 | * | 4/2002 | Bjornberg et al. ..... | 379/221.08 |
| 6,396,909 B1 | * | 5/2002 | Reksten et al. ......... | 379/88.18 |
| 6,661,882 B1 | * | 12/2003 | Muir et al. .............. | 379/127.01 |
| 6,934,377 B2 | * | 8/2005 | Bezner et al. .......... | 379/212.01 |
| 7,023,979 B1 | * | 4/2006 | Wu et al. ................ | 379/265.11 |
| 2002/0034289 A1 | * | 3/2002 | Pershan .................. | 379/207.02 |
| 2003/0063719 A1 | * | 4/2003 | Colemon ................ | 379/88.22 |
| 2006/0019650 A1 | * | 1/2006 | Kedem ................... | 455/422.1 |

* cited by examiner

*Primary Examiner*—Fan Tsang
*Assistant Examiner*—Joseph T Phan
(74) *Attorney, Agent, or Firm*—Blakely, Sokoloff, Taylor & Zafman LLP

(57) ABSTRACT

The present invention allows calls that have previously been handled by an answering system to be identified when they are forwarded from a switch back to the answering system. In one embodiment, the invention includes receiving an incoming call at an automated attendant port or answering system port, receiving a call handle associated with the incoming call, applying the call handle to retrieve caller information associated with the call handle, and using the retrieved caller information to handle the call if caller information associated with the call handle is found.

35 Claims, 4 Drawing Sheets

INTELLIGENT FORWARDED TELEPHONE CALL HANDLING WITH A CALL ANSWERING SYSTEM

FIELD OF THE INVENTION

The present invention relates to the field of handling forwarded calls with a call answering system such as a voice mail system. More particularly, the invention relates to identifying calls that have previously been handled by the answering system when they are forwarded from a switch back to the answering system.

BACKGROUND

Voice mail systems are typically used both as an automated attendant and to record messages for a user or a group of users, e.g. a company, general or receptionist voice mail box. In this regard, the voice mail system can work together with a telephone switch (such as a private branch exchange, PBX, or key service unit, KSU) so that calls will be transferred by the switch to the voice mail system and vice versa. In order to maximize the efficiency of transfers between the voice mail and the switch, blind transfers are preferred. In a blind transfer, if a call is to be transferred from voice mail to another extension, the voice mail port used by the call is released and the call is transferred to the switch immediately. The switch rings the desired extension and transfers the call to that extension if there is an answer. If there is no answer or the extension is busy, then the call is normally routed back to a new voice mail port for further automated attendant handling. The blind transfer allows the released voice mail port to be used by other callers, reducing the total number of voice mail ports that are required in a large system.

In many voice mail systems, as well as a variety of other automated call handling systems, when the automated attendant function is first accessed by an external caller, the caller is provided with a series of options. These options might include a choice of languages for the voice prompts and menu instructions, a selection of touch tone or rotary dial telephone, an account number, a caller type, such as retail customer, wholesale customer, or distributor/agent, and a variety of other options.

A caller is normally presented with a choice by the automated attendant and then the caller dials a selection. For example, the automated attendant might recite "for English dial 1, für Deutsch drück 2, för Svenska välj 3. " The caller then can select 1, 2 or 3 to send a DTMF tone to the automated attendant. Similarly, the caller can be asked to dial in any other information that will help the automated attendant to serve the caller.

As long as the voice mail system maintains the call, the information provided or selected by the caller can be stored at the voice mail system and associated with the call. When the call is transferred and the voice mail port is reassigned, however, this association is lost. So, for example, if the caller selected a transfer to another extension, was connected to that extension and then transferred back to voice mail, the voice mail system would lose the identification of the call. The caller would be forced to enter language selection, account numbers or any other information again. The same applies to any blind transfer. In the blind transfer, the voice mail system releases the call so that even if the extension to which the call was transferred did not answer and the caller was sent right back to voice mail, the caller would be asked again to enter the language selection and any other selections or information. The loss of the selections and information provided by the caller presents a significant inconvenience to the caller that may result in the caller hanging up in frustration and the caller being lost. At the least, it increases the duration of the call when the caller is reentering information. This consumes more resources of the voice mail system, the switch and the telephone network than would otherwise be necessary.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

In the present invention, caller information and selections, once they have been entered by the caller do not have to be re-entered unless the call is terminated and the caller calls back. For example, if a caller has selected Spanish language menus and instructions, that caller will continue to receive Spanish language menus and instructions as long as that caller stays on the line. Once the call is terminated, the caller can call back and is then free to make new selections. This can be a great convenience to callers that are transferred to many different extensions and are required to re-enter selections and information after each or at least some of the transfers.

In the present invention, a call handle is passed from the switch to the voice mail system. The call handle is generated by the switch based on external or internal telephone or line numbers as a unique identifier of a particular call. The call handle is used by the voice mail system to identify a call in the event that the call, once released from the voice mail system, later returns. As a result, the call can be released by the voice mail system and transferred to any number of different extensions accessible to the switch. If the call returns to the voice mail system, the voice mail system can identify it, look up any selections or information that was previously entered and use this information just as if the call was never transferred out of voice mail.

The call handle can allow users to keep any selections that were earlier made, such as languages or telephone type. It also allows any previously entered information such as identification, account numbers, status and the like to be remembered by the voice mail system. This can result in a significant convenience to the caller and can save time for both the caller and the telephone equipment.

Figure 1:
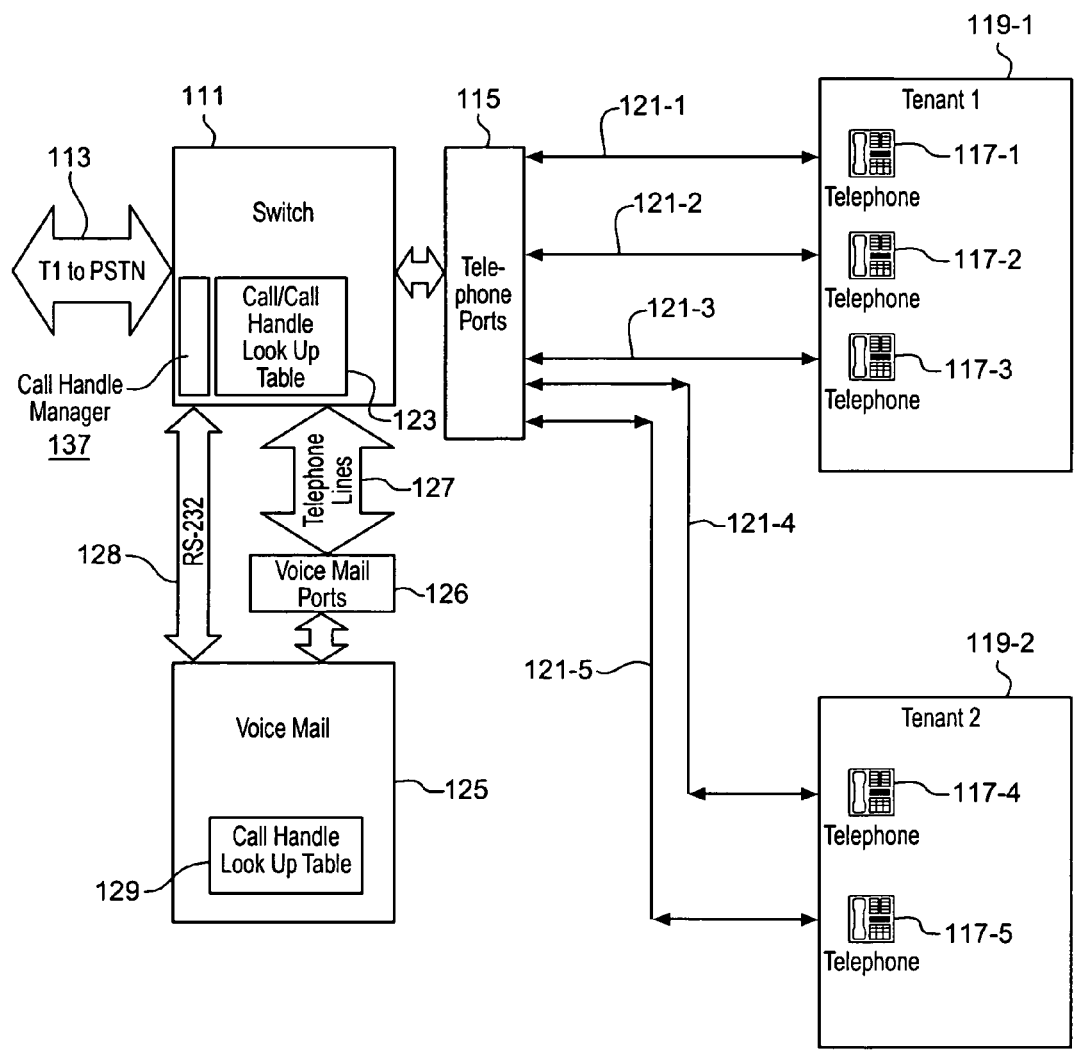
FIG. 1 is a block diagram of a switch and a voice mail system suitable for implementing the present invention.

FIG. 1 shows a conventional switch 111 such as a PBX or a KSU. The switch has an interface 113 to connect to the PSTN (Public Switched Telephone Network) such as a T1 connection to a CO (Central Office). The switch also has a set of telephone ports 115 which connect to individual subscriber telephones 117-1, 117-2, 117-3, 117-4 and 117-5 at various tenants 119-1 and 119-2. While only 5 individual telephones are shown in FIG. 1, there can be any number of telephones per tenant. In addition, the switch can also connect to computer modem lines, Ethernet routers, video ports or any other type of communications interface. While only 2 tenants are shown, the switch may support any number of tenants depending on the capacity of the switch and any of the telephones may be allocated to any one of the tenants.

The telephone ports are connected to each telephone through a twisted pair wired telephone line 121-1, 121-2, 121-3, 121-4 and 121-5. The telephone cabling is typically run through walls and ceilings of the building which, in the present example, is shared between the two tenants. However, a twisted pair connection is not required for the present invention, nor is a wired system. The telephone ports 115 may also be wireless ports which connect to mobile PCU's (Personal Communication Units) allocated to various subscribers. Similarly, the connection 113 to the PSTN may be a connection to a cellular or a radio telephone system using directional or omni-directional antennas. It may also be a connection through some other type of wide area network such as the Internet or a satellite communication system. The nature of the connection to the PSTN and the nature of the connection to each individual telephone is not important to the present invention.

In a conventional telephone switch, such as that shown in FIG. 1, the connection to the PSTN will typically carry several different telephone lines or external numbers. These are the telephone numbers that are dialed by a calling party in order to access the individual telephone ports 117 through the switch through the PSTN. The external numbers can access a general receptionist or can constitute direct lines to a particular subscriber.

On the other side of the switch, each individual telephone, computer modem, video conferencing center or other communications node, is assigned a particular internal extension number. As mentioned above, these numbers may correspond to a particular wire connected to a telephone port at one end and to a telephone wall jack at another end or these internal numbers may be virtual extension numbers that are used to assign access to users in a less tangible way. So for example, with multiple users, each carrying PCU's, the channels assigned to each user may be virtual channels which correspond to frequencies, timeslots or codes that are dynamically allocated based on system usage. In this case, the internal extension number does not correspond to any fixed allocation of resources, but instead serves as an identification number for a particular communication unit. The details of internal extension numbers, external telephone numbers and users and tenants are all stored in tables maintained at the switch.

In addition, tenants and users of this system are served by a voice mail system 125. While a voice mail system is shown and described herein, an automated attendant system or any other type of system that automatically answers and handles calls may also be used as an addition or an alternative. The same operations, connections and components apply equally to each except that an automated attendant does not normally record and store incoming messages. The recording and storing of incoming messages is not important to the present invention. The voice mail system, automated attendant system or answering system is coupled to the switch through a number of telephone lines 127 which connect to ports, such as voice mail ports 126. The voice mail ports are typically carried on the voice mail system 125. The voice mail system is also coupled to the switch through another connector 128 shown in FIG. 1 as an RS-232 connector. As is well known in the art, this connector is coupled to interface ports both in the switch and in the voice mail system. FIG. 1 also shows a tenant identification lookup table 129 within the voice mail system. The voice mail system also includes an outgoing greeting store that contains stored greetings for each tenant and each user with its associated playback devices as well as an incoming message store that records incoming messages so that they can be retrieved and played back for the intended recipients later. These components are well-known in the art and not shown.

In one embodiment, telephone calls are routed by the switch to the voice mail system through the telephone lines and voice mail ports. The calls are accompanied by a call handle through the auxiliary RS-232 line. This call handle is generated by a call handle manager 137 at the switch using a call/call handle lookup table 123 generated by and maintained at the switch. The call/call handle lookup table simply maintains a unique call handle for each call for the duration of the call. After the call has terminated, and a sufficient time has passed, the call handle can be reused for another call. The voice mail system stores the call handle in its lookup table 129 together with any selections or information that was provided by the caller during the call.

A call handle can be transmitted from the switch using an RS-232 protocol, or any other type of signaling system. The call handle can be sent through the backplane of the switch or over a special separate RS-232 connector. The particular protocol and methodology used for transmitting the call handle depends on the built-in protocols and architecture of the switch and voice mail system and not on the present invention. There are also many other ways to send a call handle. For systems which allow a separate digital control line, any number of other signaling or control channel data paths can be used on either the switch backplane or on peripheral cards including Ethernet, IP (Internet Protocol), or SS7. If no control or signaling channel is available or can be adapted, in-band signaling can be used in the voice channel. This can include different forms of modulated signaling using a variety of different types of protocols including DTMF (Dual Tone Multi-Frequency) signals. In other scenarios, various kinds of infra-red, radio or wireless type communications can be used between the switch and the voice mail system. In a software environment, the signaling can be done by any of a number of different types of calls, requests or sub-routines including API's (Application Programming Interface), RPCs (remote procedure calls), etc.

The hardware system for the switch and voice mail of FIG. 1 is conventional. In one configuration, the switch consists of an equipment rack with a large number of separate cards. Some cards handle groups of telephone ports as an interface to the wired internal extension network. Other cards carry telephone ports as an external interface to, for example, a T1 line or a voice over IP network. Some cards carry switching circuits between the various ports. Still further cards handle network management and administration including the call handle lookup table. Other cards can carry interfaces for digital signaling such as SMDI, RS-232, Ethernet etc. The cards are typically coupled together through a backplane which can be built into the equipment rack or the cards may use electrical or optical connectors coupling together the cards and the system. In some configurations, each telephone line has an analog connection and a digital connection through the backplane. The digital connection includes administration and log data, as well as identification information for each active telephone connection. This identification information can be used to associate with call handles or used as the call handles themselves. In other configurations, the telephone lines within the switch are all digital connections and each port to a user includes a digital to analog converter. In this case, information about each active telephone call can be carried in the data for that telephone call or it can be carried on the digital backplane.

Similarly, the voice mail system can be constructed using a variety of hardware or software configurations well known in the art. In one configuration, the voice mail system is based on a conventional microcomputer architecture using a single central processor, a hard drive memory storage for messages and configuration tables and adapter cards coupled to a shared communications bus to receive telephone lines and constitute the voice mail ports shown in FIG. 1. Such a microcomputer architecture allows for a large variety of different communications interfaces including the RS-232 connector shown in FIG. 1. Higher bandwidth communications can be routed through token key network connections or Ethernet connections, for example, as well as through a variety of other digital and analog communications protocols.

In another configuration, the voice mail system is constructed as a separate card which plugs into the equipment rack occupied by the switch. The voice mail card connects to the same backplane as the cards of the switch. In this case, the voice mail ports can offer a connection similar to that offered by the telephone ports and can be coupled to the switching architecture using electrical or optical lines or directly through the backplane. Separate data connections such as the RS-232 connection shown in FIG. 1 can be coupled using separate wires or also through the backplane of the equipment rack. In another configuration, the voice mail system can exist as independent software modules running directly on the switch central processing unit or some other part of the switch hardware architecture. Such a configuration is illustrated for example, in FIG. 2.

In one version of a voice mail system, the voice mail ports all are provided on a card which emulates a set of digital telephone lines. These digital telephone lines spoof all of the necessary functionality that is provided by digital telephones 117. With this configuration, a telephone call which has been directed to a user's telephone 117 (digital, analog, hybrid, etc.) can then be forwarded to a voice mail port using the standard functionality of the switch which forwards calls from one extension to another. Forwarded calls to voice mail ports existing as emulated digital phones are handled just like any other type of voice mail port (typically analog), although digital phones normally are capable of receiving a wealth of data/intelligence directly from the switch.

In many such switches, the telephone lines have both a digital signaling stream and a digital voice stream both carried on the backplane. The digital signaling stream includes instructions for telephone subscriber units such as instructions to flash the lights, ring the telephone, show a message light, transfer the line to another extension etc. One such digital signaling system is SMDI. The SMDI protocol sends called and calling party information as well as a code indicating the reason the call was forwarded (presumably to a voice mail port) over an RS-232 (i.e. serial) cable. An alternative architecture is to provide a digital voice stream in which headers contain these kinds of signaling instructions and the voice information is also carried digitally. The digital information can be used to allow the voice mail system to determine which user's voice mail box to use for recording a message. However, it cannot be used to identify a call that has already been processed or handled by the voice mail system. In other such architectures, digital signaling information is conveyed through other types of digital interfaces and may also be optional. For example, with some switches digital signaling and control information is provided using an RS-232 protocol that is supported by unique cards that can be added to the switch system. In order to support these switch systems, a similar card or utility can be added to the voice mail system.

Figure 2:
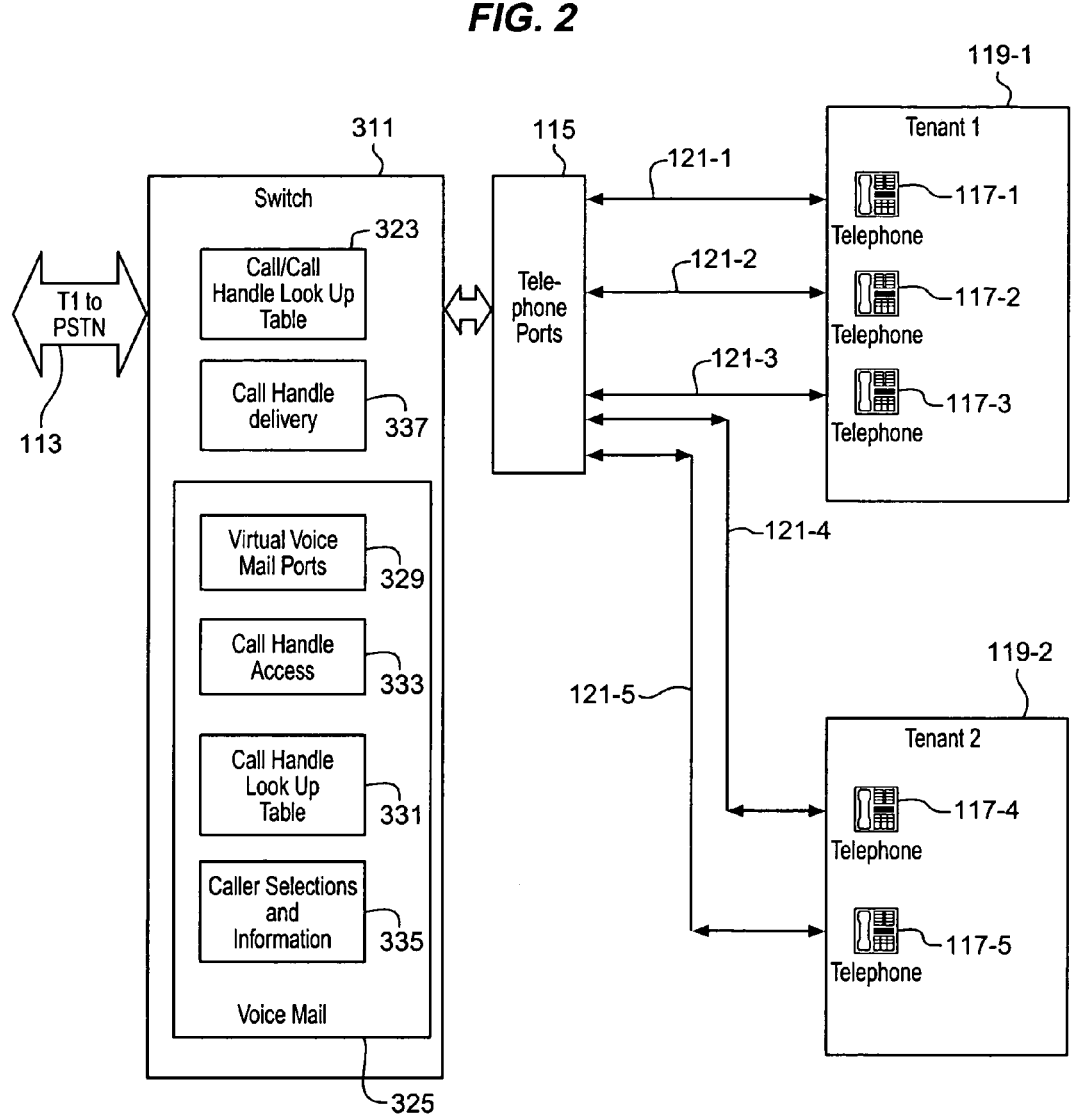
FIG. 2 is a block diagram of a switch and a software-based voice mail system suitable for implementing the present invention.

FIG. 2 shows a switch and voice mail system in which the voice mail system is integrated into the software of the switch. The switch can be built in any of a variety of different software configurations. In one embodiment, an operating system, for example Vx Works, can be used to allow different modules of the system to be constructed and compiled separately and then integrated later in binary form. As with FIG. 1, the switch 311 is coupled 113 to the PSTN 109. It includes a number of telephone ports 115 which connect the radio or wired connections 121 to individual telephones 117 of each tenant 119. Inside the switch 311, there is a call/call handle lookup table 323 and a call handle manager 337. When a telephone call is to be routed to voice mail, the call handle delivery module 337 generates a call handle stores it in the call/call handle lookup table and provides it to the voice mail module 325. The voice mail module receives a telephone call at virtual voice mail ports 329 and uses a call handle access module 333 to obtain the call handle from the call handle delivery module 337. The call handle access module 333 applies this call handle to a call handle lookup table 331. This is then used to retrieve any selections and information previously provided by that caller from a caller selections and information table 335. Putting these modules together allows voice mail functionality to be provided in the switch software 311.

In particular, while the voice mail module is specially adapted to provide the functionalities described above using its unique modules, the switch requires only one unique additional module which is the call handle delivery module 337. This module can be constructed independently of the rest of the switch software. It requires only a trigger event and then a simple direct access to the call/call handle lookup table. As mentioned above, a suitable table of call identifiers may already be maintained by the switch for other purposes and these call identifiers can be used as the call handles. Using this one additional module, all of the voice mail functionality can be provided without requiring the caller to reenter any selections or information.

Figure 3:
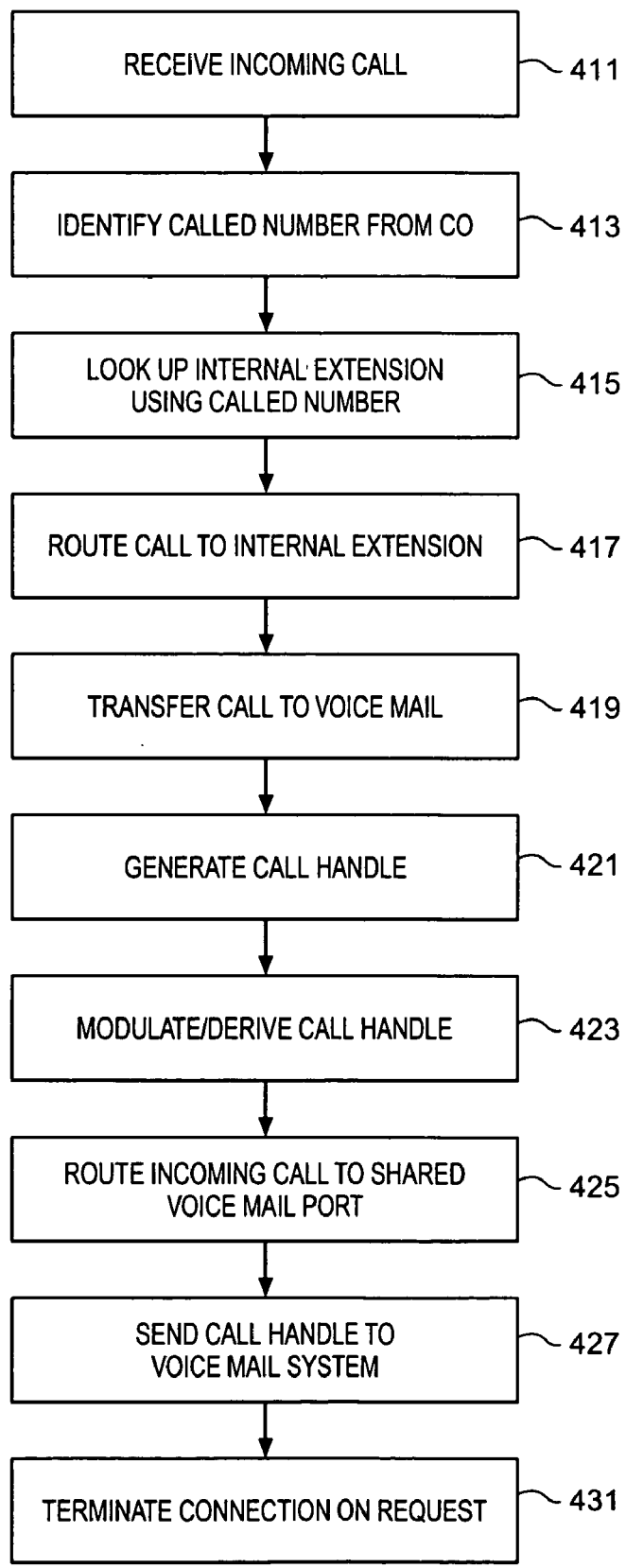
FIG. 3 is a flow diagram of a call handling process as implemented by a switch.
Figure 4:
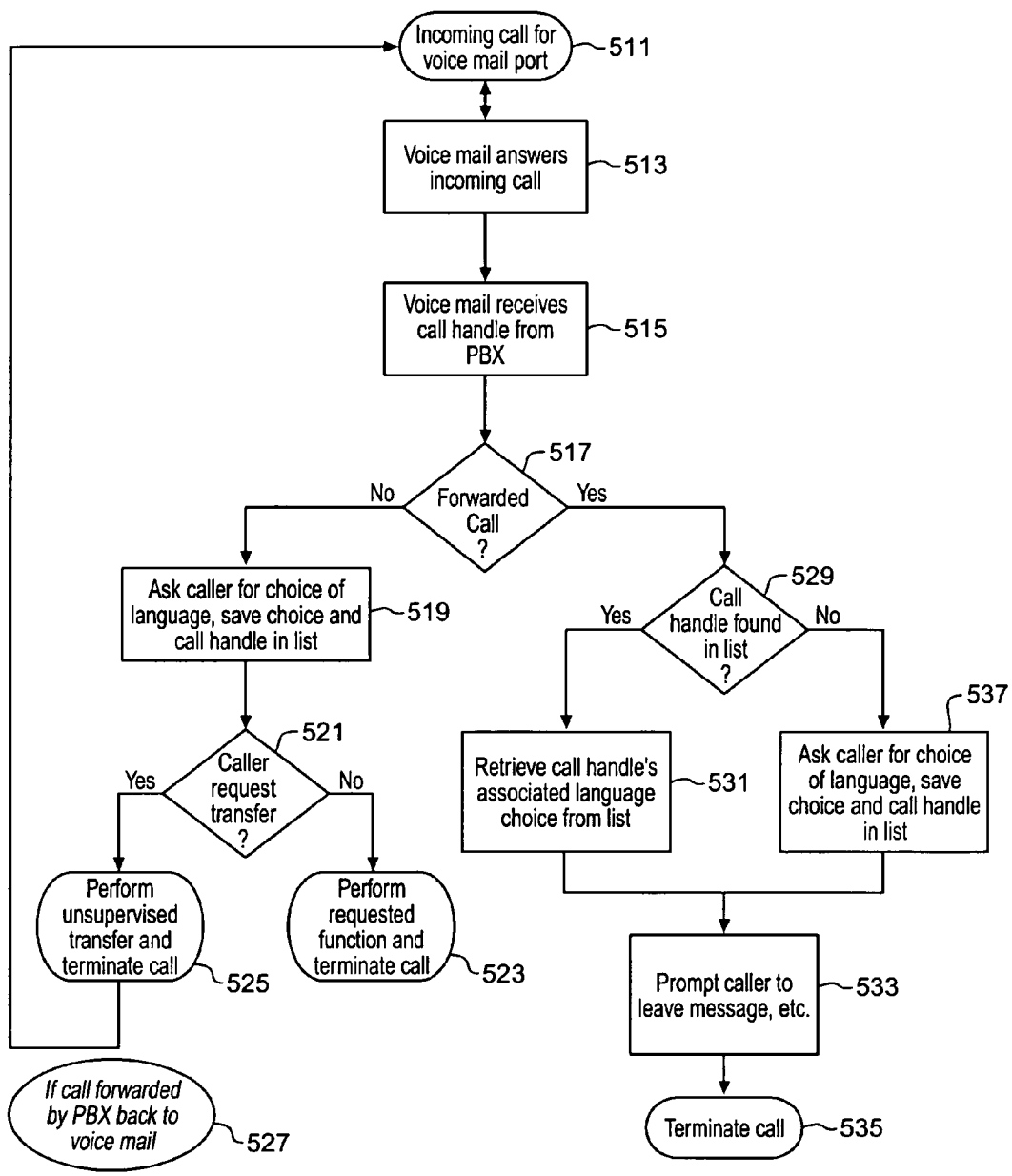
FIG. 4 is a flow diagram of a call handling process as implemented by a voice mail system.

The features of the present invention can be further understood with reference to the process illustrated in FIGS. 3 and 4. FIGS. 3 and 4 restate many of the ideas discussed above with respect to FIGS. 1 and 2. A voice mail exchange begins when an incoming call is received 411. The called number from the CO (central office) of the PSTN or the equivalent is identified by the switch 413. The switch can then look up an internal extension using the called number 415. The internal extension may be an internal extension which goes to a reception desk or it could be an extension which goes directly to voice mail. The switch can also use other functions to determine correct routing of the call including "do not disturb" and forwarding instructions as is well-known in the art. The call is then routed to the internal extension 417. In many instances, if this is not a voice mail extension, the call will be forwarded to voice mail 419.

When the call is forwarded to voice mail, the switch generates a call handle 421 based on the calling party, time of receipt or any other information. It modulates or derives a call handle code based on that called number 423, routes the incoming call to a shared voice mail port 425 and sends the modulated or derived call handle code to the voice mail system 427. The switch will also often send a variety of other network administration and management information as well as information about the call such as the extension from which the call came, if any. The voice mail system will handle the call and at some point indicate that the call is to be terminated or transferred to another extension. Typically, the voice mail system sends a hook switch signal or digital transfer request. The connection will then be terminated or transferred on this request 431.

From the voice mail system's perspective, its activity, according to the present invention, begins when it receives an incoming call at any one of its voice mail ports 511. The voice mail system will answer the incoming call 513 and receive a call handle for the incoming call 515 from the switch. If the function is supported by the switch, the voice mail system will also be told by the switch whether the call was forwarded from an internal extension or is a new call 517. If the call is new and was not forwarded, then the voice mail system can present the caller with a pre-programmed set of questions and information requests 519 such as a choice of language for greetings and menus. The choice of language, together with any other choices or entered information is then stored in a lookup table in association with the call handle.

In some systems, the caller can enter an identification code and be provided with information directly over the telephone line. Banks, investment fund services, airlines, and some retail sales organizations among others offer such a service. In such a case, the caller may be routed directly to the voice mail system, be asked to select a number and then be asked to select the information desired. Public information such as hours of operation or airplane flight status can be offered directly, and personal account information can be offered after the caller enters an account number and perhaps a personal identification number. In such a case, the caller may hang up after obtaining the desired information or request a transfer from the voice mail system to another extension.

If the caller does not request a transfer 521, then the caller, after providing or receiving the requested information will terminate the call 523. The call handle is then not used for any purpose and may be reused for future callers. If the caller does request a transfer 521, the transfer is performed 525 and the call is returned to the switch.

It can then occur that after being transferred out of the voice mail system, the call is routed back to the voice mail system 527. Such a call is initially handled the same way as it was originally. The call is received 511 and answered 513 and the call handle is received 515 in any of the ways discussed above. The voice mail system then determines whether the call is forwarded from an internal extension 517 and finding that it was goes to its call handle lookup table to determine whether there is any other information on the call. If there is, then this information is used 531 in handling the call. In the example of FIG. 4, the last time that caller was handled by the voice mail system, the caller made a language choice, for example, Spanish. Now, upon returning to voice mail, using the call handle lookup table, the voice mail system will retrieve the language choice and answer the call in Spanish. It can also present any instructions or menu options in Spanish. This relieves the caller from having to re-enter the choice of language. If the caller made more selections or provided more information such as account numbers or areas of inquiry, the benefit to the caller is enhanced accordingly. The caller may be prompted to leave a message 533 or request a transfer or any other activity offered by the system, after which the call can be terminated 535 or transferred.

If the call handle for the forwarded call is not found in the call handle lookup table 529, then the caller will be asked to enter or re-enter the selections and information 537. This data will then be stored in association with the call handle in the call handle lookup table. The call can then be handled in the same way as the call for which a call handle lookup table entry was found 533, 535. The forwarded call will not have an entry in the call handle lookup table if, for example, the call had not yet been handled by the voice mail system. It could also happen that as a result of the type of transfers that were performed, for example, a transfer to an external line or another switch, the call has a different call handle than it did before. It can be appreciated that it is not necessary to determine whether a call has been forwarded from another extension. The voice mail system can alternatively check the call handle lookup table directly whether or not the call was forwarded. In addition, the calls, instead of being terminated by the voice mail system, might be transferred to the switch for termination. A variety of other modifications and adaptations of the process flow of FIG. 4 will be apparent to one of average skill in the art.

In the description above, for purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIG. 1, or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while the present invention has been described in the context of a voice mail system for a shared switch, it can be applied to a wide variety of shared voice mail or generic messaging systems in which identification information can be exchanged. Such systems include voice over IP, data switched and router based systems. The telephone calls may include voice, video, music, broadcast and data calls. The present invention can be applied to fixed telephone terminals as well as to low and high mobility voice and data terminals. Many of the methods are described in their most basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

The invention claimed is:

1. A method comprising:
   receiving an incoming call at a voice mail system from a connected private telephone switch, the switch being coupled between the PSTN (Public Switched Telephone Network) and a plurality of individual subscriber telephones, the incoming call coming to the switch through the PSTN, the voice mail system having greeting and message storage for at least some of the plurality of individual subscriber telephones, the incoming call being directed to one of the plurality of individual subscriber telephones;
assigning the call to a first voice mail port of the voice mail system;
receiving a call handle associated with the incoming call at the voice mail system from the switch;
receiving a personal selection from the caller during the call;
associating the personal selection with the call handle in a voice mail system database;
transferring the call to the switch;
releasing the first voice mail port from the call;
receiving the same call again from the switch;
assigning the incoming call to a second voice mail port of the voice mail system;
receiving the same call handle associated with the incoming call at the voice mail system from the switch;
receiving an indication from the switch that the incoming call has been previously handled by the voice mail system;
applying the call handle to a database of the voice mail system to retrieve the previously received personal selection stored in the voice mail system database that is associated with the call handle, in response to the indication that the incoming call has been previously handled by the voice mail system; and
using the retrieved personal selection at the voice mail system to handle the incoming call.

2. The method of claim 1, wherein receiving a call handle comprises receiving a tone sequence at a port of the voice mail system, decoding the tone sequence, and deriving the call handle from the decoded tone sequence.

3. The method of claim 2, wherein the tone sequence is a DTMF tone sequence transmitted to the port over the same transmission line as the incoming call.

4. The method of claim 1, wherein receiving a call handle comprises receiving a call handle message through a digital interface.

5. The method of claim 4, wherein the digital interface comprises a digital backplane connection to a switch from which the incoming call was received.

6. The method of claim 1, wherein receiving a personal selection comprises requesting data from the caller and storing received data in association with the call handle.

7. The method of claim 1, wherein using the retrieved personal selection comprises providing audio information in a language previously selected by the caller.

8. The method of claim 1, further comprising, if no personal selection associated with the call handle is found:
requesting caller information from the caller,
storing received caller information in association with the call handle; and
using the received caller information to handle the incoming call.

9. The method of claim 1, wherein receiving an indication of whether the incoming call has been previously handled comprises receiving an indication of whether the incoming call has been forwarded from one of the plurality of individual subscriber telephones.

10. The method of claim 9, further comprising, if no personal selection associated with the call handle is found:
requesting caller information from the caller;
storing received caller information in association with the call handle; and
using the received caller information to handle the incoming call.

11. A machine-readable medium having stored thereon data representing instructions which, when executed by a machine, cause the machine to perform operations comprising:
receiving an incoming call at a voice mail system from a connected private telephone switch, the switch being coupled between the PSTN (Public Switched Telephone Network) and a plurality of individual subscriber telephones, the incoming call coming to the switch through the PSTN, the voice mail system having greeting and message storage for at least some of the plurality of individual subscriber telephones, the incoming call being directed to one of the plurality of individual subscriber telephones;
assigning the call to a first voice mail port of the voice mail system;
receiving a call handle associated with the incoming call at the voice mail system from the switch;
receiving a personal selection from the caller during the call;
associating the personal selection with the call handle in a voice mail system database;
transferring the call to the switch;
releasing the first voice mail Port from the call;
receiving the same call again from the switch;
assigning the incoming call to a second voice mail port of the voice mail system;
receiving the same call handle associated with the incoming call at the voice mail system from the switch;
receiving an indication from the switch that the incoming call has been previously handled by the voice mail system;
applying the call handle to a database of the voice mail system to retrieve the previously received personal selection stored in the voice mail system database that is associated with the call handle, in response to the indication that the incoming call has been previously handled by the voice mail system; and
using the retrieved personal selection at the voice mail system to handle the incoming call.

12. The medium of claim 11, wherein if no personal information associated with the call handle is found, the instructions, when executed by the machine, cause the machine to perform further operations comprising;
requesting caller information from the caller;
storing received caller information in association with the call handle; and
using the received caller information to handle the incoming call.

13. The medium of claim 11, wherein if the incoming call has not been previously handled by the voice mail system, the instructions, when executed by the machine, cause the machine to perform further operations comprising:
requesting caller information from the caller;
storing received caller information in association with the call handle; and
using the received caller information to handle the incoming call.

14. An apparatus comprising;
a voice mail system to receive an incoming call from a connected private telephone switch, the switch being coupled between the PSTN and a plurality of individual subscriber telephones, the incoming call coming to the switch through the PSTN (Public Switched Telephone Network), the incoming call being directed to one of the plurality of individual subscriber telephones;

greeting and message storage of the voice mail system for at least some of the plurality of individual subscriber telephones;

a first voice mail port of the voice mail system to receive an assignment of the incoming call, and a call handle associated with the incoming call from the switch the first voice mail port also receive a personal selection from the caller during the call, to transfer the call to the switch and to receive a release of the assignment;

a memory of the voice mail system containing personal selections associated with call handles;

a second voice mail port to receive an assignment of the same call again from the switch, to receive the same call handle associated with the incoming call from the switch, and to receive an indication from the switch that the incoming call has been previously handled by the voice mail system; and a processor of the voice mail system to associate the personal selection from the first voice mail port with the call handle and store it in the memory, to apply the call handle received at the second voice mail port to the memory to retrieve the personal selection that is associated with the call handle and to use the retrieved personal selection to handle the incoming call if the incoming call has been previously handled by the voice mail system.

15. The apparatus of claim 14, wherein the voice mail system port to receive the call handle comprises a digital interface.

16. The apparatus of claim 15, wherein the digital interface comprises a digital backplane connection to the switch.

17. A method comprising:

receiving an incoming call at a private telephone switch through the PSTN (Public Switched Telephone Network), the incoming call being directed to one of a plurality of individual subscriber telephones that are coupled to the switch;

generating a call handle for the incoming call at the switch;

routing the incoming call to a port of a connected call handling system, the call handling system having greeting and message storage for at least some of the plurality of individual subscriber telephones;

sending the call handle to the call handling system in association with the routed incoming call;

receiving a transfer of the call from the call handling system;

routing the same call to a second port of the connected call handling system;

sending the same call handle to the call handling system in association with the routed call; and sending an indication to the call handling system of whether the incoming call routed to second port has been previously handled by the call handling system in association with the routed incoming call.

18. The method of claim 17, wherein sending the call handle comprises deriving a tone sequence for the identification, coding the tone sequence into tones and sending the tone sequence as a set of in-band signaling tones to the call handling system port.

19. The method of claim 18, wherein the tone sequence is a DTMF tone sequence transmitted to the call handling system port over the same transmission line as the incoming call.

20. The method of claim 17, wherein sending the call handle comprises sending an identification message through a digital interface.

21. The method of claim 20, wherein the digital interface comprises a digital backplane connection to the call handling system.

22. A machine-readable medium having stored thereon data representing instructions which, when executed by a machine, cause the machine to perform operations comprising:

receiving an incoming call at a private telephone switch through the PSTN (Public Switched Telephone Network), the incoming call being directed to one of a plurality of individual subscriber telephones coupled to the switch;

generating a call handle for the incoming call at the switch;

routing the incoming call to a port of a connected call handling system, the call handling system having greeting and message storage for at least some of the plurality of individual subscriber telephones;

sending the call handle to the call handling system in association with the routed incoming call;

receiving a transfer of the call from the call handling system;

routing the same call to a second port of the connected call handling system;

sending the same call handle to the call handling system in association with the routed call; and sending an indication to the call handling system of whether the incoming call routed to second port has been previously handled by the call handling system in association with the routed incoming call.

23. The medium of claim 22, wherein the instructions for sending the call handle comprise instructions which, when executed by the machine, cause the machine to perform further operations comprising sending an identification message through a digital interface.

24. The medium of claim 23, wherein the digital interface comprises a digital backplane connection to the call handling system.

25. An apparatus comprising:

a port to receive an incoming call at a private telephone switch through the PSTN (Public Switched Telephone Network), the incoming call being directed to one of a plurality of individual subscriber telephone that are coupled to the switch;

a call handle generator to generate a call handle for the incoming call at the switch;

a switching network to route the incoming call from the receiving port to a port of a connected call handling system, the call handling system having greeting and message storage for at least some of the plurality of individual subscriber telephones, the switching network further to receive a transfer of the call from the call handling system and to subsequently re-route the call to another port of the call handling system; and an interface to send the same generated call handle each time the call is routed to the call handling system and an indication of whether the incoming call has been previously handled by the call handling system to the port of the call handling system in association with the routed incoming call.

26. The apparatus of claim 25, wherein the interface comprises a digital interface.

27. The apparatus of claim 26, wherein the digital interface comprises a digital backplane connection to the call handling system.

28. The method of claim 1, further comprising releasing the incoming call to the switch and, after a sufficient time, deleting caller information associated with the call handle.

29. The medium of claim 11, wherein the instructions further comprise instructions which, when executed by the machine, cause the machine to perform further operations comprising releasing the incoming call to the switch and, after a sufficient time, deleting caller information associated with the call handle.

30. The method of claim 17, further comprising releasing the incoming call and, after a sufficient time, reusing the call handle for another call.

31. The medium of claim 22, further comprising releasing the incoming call and, after a sufficient time, reusing the call handle for another call.

32. The method of claim 1, wherein assigning the incoming call to a second voice mail port comprises assigning the incoming call to a different voice mail port than the first voice mail port.

33. The method of claim 1, further comprising, after using the personal selection, transferring the call to the switch and releasing the second voice mail port from the call.

34. The method of claim 17, further comprising reusing the call handle for another call after the call has terminated.

35. The method of claim 25, wherein the call handle generator reuses the call handle for another call after the call has terminated.

* * * * *